Figure 1:
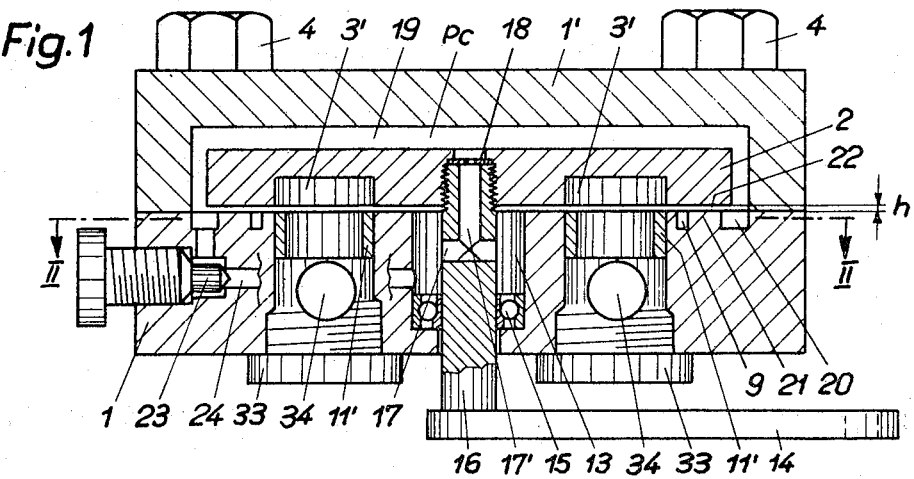

United States Patent [19]

Cyphelly

[11] 3,768,516
[45] Oct. 30, 1973

[54] ROTARY CONTROL VALVE

[76] Inventor: Ivan Jaroslav Cyphelly, Forchstrasse 968, Hinteregg, Switzerland

[22] Filed: Jan. 22, 1973

[21] Appl. No.: 325,246

[30] Foreign Application Priority Data
Jan. 25, 1972 Switzerland.......................... 1088/72

[52] U.S. Cl.............. 137/625.46, 251/283, 137/609
[51] Int. Cl......................... F16k 39/00, F16k 11/00
[58] Field of Search............................ 251/304, 283; 137/609, 625.21, 625.41, 625.43, 625.46, 596.12

[56] References Cited
UNITED STATES PATENTS

| | | | |
|---|---|---|---|
| 3,590,872 | 7/1971 | Baity............................... | 137/625.46 |
| 3,542,071 | 11/1970 | Lightner......................... | 137/625.46 |
| 3,460,574 | 8/1969 | Risher......................... | 137/625.46 X |
| 3,456,689 | 7/1969 | Ludwig............................ | 251/283 X |
| 3,451,428 | 6/1969 | Pruett............................. | 137/625.46 |
| 3,040,777 | 6/1962 | Garson et al............. | 137/625.46 X |
| 2,653,003 | 9/1953 | Overbeke.................. | 137/625.43 X |

Primary Examiner—Samuel Scott
Assistant Examiner—Ira S. Lazarus
Attorney—Kurtkelman et al.

[57] ABSTRACT

A rotary control valve for a hydraulic system has a valve body formed with intake and discharge openings which may be connected by aligning recesses in respective opposite sealing faces of the valve body and of a distributor disc mounted on the body for angular movement about an axis. Limited axial movement of the disc permits a narrow gap to be maintained between annular portions of the two faces offset from the recesses in a radially outward direction because a chamber partly bounded by a face of the distributor member directed away from the aforementioned face of the valve body and communicating with the gap is vented through a throttled conduit. Contaminants in the gap may be flushed out by manually opening a valve providing a bypass around the throttle in the venting conduit.

8 Claims, 2 Drawing Figures

PATENTED OCT 30 1973 3,768,516

ROTARY CONTROL VALVE

This invention relates to the control of hydraulically operated devices, and particularly to a rotary control valve.

Manually operated valves in practical use heretofore for controlling hydraulically operated devices were usually slide valves, generally having a sleeve with a cylindrical bore and a movable valve member conformingly received in the bore of the sleeve. Alignment of recesses in the valve member and the sleeve permits or prevents liquid flow between intake and discharge openings of the sleeve. It is relatively difficult to shape the cylindrical surfaces of the valve member and the sleeve with the necessary precision, and there have been many attempts to build hydraulic control valves in which the interface between the fixed and movable valve parts is planar, and in which the opposite faces of the two valve parts are separated by a gap narrow enough to seal the valve against significant leakage, yet adequate for maintaining a lubricant film minimizing wear of the cooperating faces. However, the known expedients for maintaining the gap width with adequate precision are either unreliable or costly and complex.

It is a primary object of this invention to provide a rotary control valve for hydraulically operated devices in which the fixed and movable valve parts are connected for relative angular movement about an axis, and for limited, relative axial movement, and have opposite recessed faces transverse to the axis, and a gap of precisely controlled width is maintained between the faces in a simple and reliable manner.

More specifically, the invention aims at a control valve of the type referred to in which the gap width is maintained by the hydrostatic pressure of the controlled liquid.

With these objects and others in view, as will hereinafter become apparent, the invention, in its more specific aspects, provides a rotary control valve of the afore-described general structure in which the sealing gap is defined between respective annular portions of the two opposite faces of the two valve parts and is offset radially outward from the recesses in the two faces. A cover or the like envelops the movable valve member, hereinafter referred to as a distributor member, in sealing engagement with the body portion of the valve. The cover and a face of the distributor member directed axially away from the body portion bound therebetween a chamber which communicates with the sealing gap, and in which a pressure lower than that of the controlled fluid can be maintained by a pressure relief conduit leading outward of the valve from the chamber, and a throttling device in the conduit for maintaining a pressure differential between portions of the conduit separated by the throttling device when fluid flows through the conduit.

Figure 2:
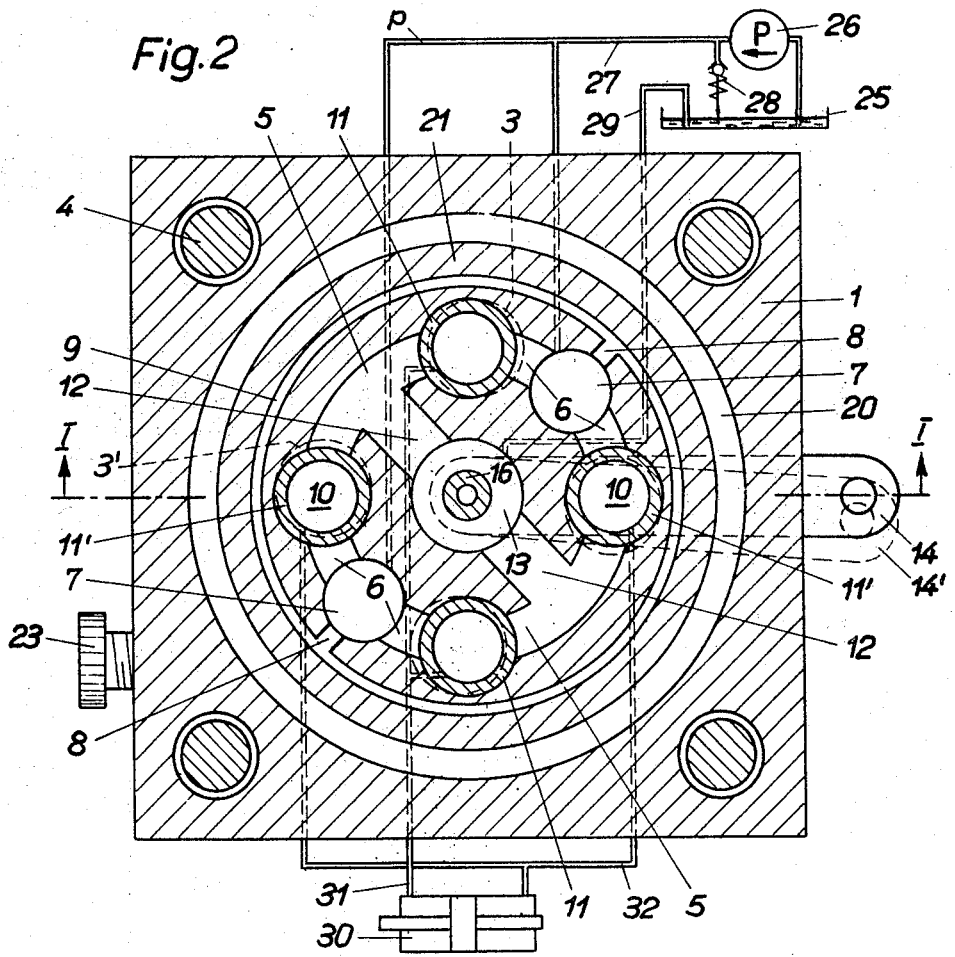

Other features, additional objects, and many of the attendant advantages of this invention will readily become apparent from the following detailed description of a preferred embodiment when considered in connection with the appended drawing in which:

FIG. 1 shows a reversing valve of the invention in section on the line I — I in FIG. 2, except as more fully explained hereinbelow; and FIG. 2 illustrates the apparatus of FIG. 1 in section on the line II — II, and associated elements of a hydraulic circuit in a conventional manner.

Referring now to the drawing in detail, there is seen a valve whose casing consists of a body portion 1 and a cover portion 1'. A circular distributor disc 2 is arranged in the valve casing and one of its planar circular faces has two pairs 3, 3' of blind axial bores, all four bores being visible only in phantom view in FIG. 2. The bores are cylindrical and their axes are distributed equiangularly along a common circle about the axis of the disc 2. The two parts of the casing are held in sealing engagement by machine screws 4.

The planar sealing face of the body portion 1 opposite the afore-mentioned circular sealing face of the distributor disc 2 has three, concentric, circular grooves. The radially innermost groove is divided into two pairs 5, 6 of arcuate sections. An enlarged, blind, axial bore 7 in the sealing face intersects each groove section 6, and a radial groove 8 connects each bore 7 and the associated groove section 6 to the intermediate circular groove 9.

The groove sections 5, 6 are separated from each other by four axial bores 10 extending through the axial thickness of the body portion 1 and by two pairs 11, 11' of diametrically opposite, partly tubular plugs whose imperforate heads 33 seal the bores 10. In the position of the apparatus shown in FIG. 1 and shown in FIG. 2 in fully drawn lines, the orifices of the axial plug bores are axially aligned with the blind bores 3,3' of the distributor disc 2. Grooves 12 lead radially inward in the sealing face of the body portion 1 from the groove sections 5 to the wide end of a stepped cylindrical bore 13 coaxial with the circular grooves in the sealing face.

The distributor disc 2 may be turned about the common axis of the three grooves by means of an operating handle or arm 14 radially extending outside the valve casing from a shaft 16 whose inner end is fixedly fastened to the disc 2 in a central bore of the latter. A ball bearing 15 in the bore 13 prevents radial movement of the shaft 16 while permitting a very limited axial shift of the shaft and of the disc 2 mounted thereon. The ball bearing also movably seals the shaft 16 to the body portion 1 to prevent outward leakage of fluid from the bore 13 toward the arm 14.

A diametrical bore 17 and an axial bore 17' in the shaft 16 connect the bore 13 with the small central orifice of a thin throttling washer 18 which is fixedly secured in the central bore of the disc 2 between the radial end face of the shaft 16 and a shoulder of the disc 2. The aperture in the washer 18 is relatively short, as compared to its diameter, and provides a sharply restricted venting connection between the bore 17' and a chamber 19 whose main portion is axially bounded between the imperforate circular face of the distributor disc 2 and an inner radial face of the cover 1', but an annular portion of the chamber 19 also radially separates respective cylindrical faces of the cover 1' and the disc 2.

The third and outermost circular groove 20 in the sealing face of the body portion 1 is separated from the intermediate groove 9 by a continuous, annular land portion 21 of the sealing face, and the planar land portion 21 and the opposite planar, annular face portion of the distributor disc 2 extend each in closed loop about the valve axis, and they define therebetween a narrow sealing gap 22. The groove 20 is axially aligned with the annular portion of the chamber 19 so that the gap 22 communicates with the chamber 19.

FIG. 1 shows a manually adjustable and normally closed valve 23 in a by-pass conduit 24 which connects the groove 20 with the bore 13. However, the valve 23 and conduit 24 are laterally offset from the section plane I—I, as is evident from FIG. 2, and have been illustrated otherwise in FIG. 1 merely for the convenience of pictorial representation. The conduit 24 passes between two bores 10 and well below the bottom of a bore 7. It has been omitted from FIG. 2 for the sake of clarity.

The axial bores of the plugs 11, 11' communicate with respective radial orifices 34, and the latter, in turn, communicate with intake and discharge openings in the body portion 1, only conventionally indicated in FIG. 2 as parts of respective pressure fluid lines 31, 32. Other intake and discharge openings communicate with the axial bores 7, 13 as indicated by fluid lines 27, 29.

FIG. 2 also shows the other elements of a hydraulic circuit with which the control valve of the invention cooperates in a typical application.

They include a sump 25 for hydraulic fluid which is forced under pressure into the line 27 by a pump 26. The pressure P in the line 27 is limited to a value set on a pressure relief valve 28 which returns the pumped liquid directly to the sump 25 if its pressure exceeds the set limit. The conduit 29 returns fluid from the bore 13 to the sump 25.

One of the two ports of a reversible hydraulic motor 30 is connected by the line 31 to the two plugs 11, and the other motor port is connected to the plugs 11' by the line 32.

The apparatus operates as follows:

As long as the bores 3, 3' in the distributor disc 2 are axially aligned with the orifices of the axial bores in the plugs 11, 11', as is shown in fully drawn lines in FIG. 2, the fluid in the line 27, the bores 7, the groove sections 6, the radial grooves 8 and the intermediate circular groove 9 is under the full pump pressure P. The bore 13, the radial grooves 5, the groove sections 5 are practically at the atmospheric pressure prevailing above the hydraulic fluid in the sump 25. The pressure in all plugs 11,11', the lines 31,32, and the motor 30 is equal and of a magnitude determined by the leakage flow of pressure fluid between the groove sections 5, 6.

When the handle or arm 14 is shifted into the angular position 14' indicated in FIG. 2 in broken lines, the blind bores 3 in the disc 2 connect the groove sections 6 to the bores of the plugs 11, and thus to the line 31 which then supplies fluid under pressure to one port of the motor 30 while fluid is returned from the other port to the sump 25 through the line 32, the bores of the plugs 11', the bores 3' in the disc 2, the groove sections 5, the bore 13, and the return line 29.

When the handle 14 is turned further in the same direction, the fluid flow to the motor 30 is increased gradually to a maximum, gradually reduced thereafter to zero, and resumed in the opposite direction as the bores 3 connect the plugs 11' to the groove sections 6 while the bores 3' overlap the plugs 11 and the groove sections 5. The speed as well as the direction of movement of the motor 30 may thus be controlled by means of the illustrated valve.

To permit manual operation of the handle 14 and to avoid wear in the valve, the force required for turning the shaft 16 must be as small as possible. The ball bearing 15 provides practically frictionless redial guidance for the shaft 16. The axial position of the shaft 16 and of the disc 2 is unaffected by the ball bearing 15 within relevant limits.

The fluid in the groove 9 is almost at the full pump pressure P during operation of the motor 30 against a load, not shown. The narrow gap 22 permits leakage flow of fluid from the groove 9 into the chamber 19, and the throttling effect of the gap reduces the pressure in the chamber 19 to a value $P_c$, smaller than P, but still substantially higher than the pressure prevailing in the bore 13. The pressure differential between the chamber 19 and the bore 13 is maintained by the restricted flow section of the washer 18.

A steady state is quickly established in which the fluid pressure exerted axially on the distributor disc 2 by the fluid in the gap 22 is balanced by the axially opposite fluid pressure exerted on the disc 2 in the chamber 19. The rate of fluid flow through the gap 22 must equal that through the aperture in the throttling washer 18. For any given pressure P, the width $h$ of the gap 22 is thus uniquely defined if the fluid in the sump 25 is exposed to the atmosphere. If the sump 25 is enclosed and a pressure different from atmospheric pressure is maintained in the sump tank 25, the chamber 19 is still vented through the washer 18 and associated elements which constitute a pressure relief conduit leading outward of the valve from the chamber 19.

Under certain conditions, an arrangement similar to that described above may not readily reach a steady state and tend to oscillate between cyclically varying values of $h$. The rate at which such oscillations are damped is a function of the internal friction losses in the liquid passing the gap 22. Oscillation is more likely to occur, other factors being identical, when the operating pressure exceeds a critical limit characteristic for a specific valve, or when the temperature of the hydraulic fluid increases to reduce the viscosity of the fluid below a certain limit.

The illustrated rotary control valve of the invention is virtually immune against oscillations of the type described because the fluid flow through the gap 22 between the planar land 21 and the equally planar opposite face portion of the distributor disc has a predominant laminar component and negligible turbulence. On the other hand, the change in flow section at the passage through the washer 18 is so sudden, and the length of the passage is so small as compared to the radial length of the gap 22 as to favor turbulence in the pressure relief conduit. Under these conditions, the gap width $h$ decreases with increasing pressure and decreasing viscosity of the hydraulic fluid, and conditions favorable for oscillation are never established under practical operating conditions.

Because of the small axial width of the gap 22, solid, particulate contaminants may be strained from the hydraulic fluid at or near the gap 22 even if the hydraulic circuit contains an oil filter, not shown, and the solid contaminants may cause undesirable friction which hastens wear of the sealing faces and may make manual operation of the valve more difficult. The usual slide valves need to be disassembled from time to time to remove collected solid particles. The gap 22 of the illustrated valve may be flushed clean simply and conveniently by opening the by-pass valve 23 without actually interrupting operation of the motor 30. The valve 23 by-passes the throttling washer 18 with an effective flow section much greater than that of the aperture or passage in the washer, so that the flow of fluid from the chamber 19 to the bore 13 and the sump 25 is increased. To satisfy the conditions of steady state, as set forth above, more fluid also must enter the chamber 19, and the width h of the gap 22 is automatically increased by axial movement of the disc 2 when the valve 23 is opened. The contaminating particles are swept through the enlarged gap and ultimately into the sump 25.

While the force required for operating the handle 14 is so small as to make manual operation of the valve entirely practical, the valve illustrated may be operated by a remotely controlled motor in an obvious manner, and the motor may be energized hydraulically, pneumatically, electrically, or in any other desired manner for turning the shaft 16.

The illustrated valve is a reversing valve having at least four intake and discharge openings, but those skilled in the art will readily apply the above teachings to any planar valve having at least one intake opening and one discharge opening, or any number of such openings greater than as specifically disclosed.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the appended claims.

What is claimed is:

1. In a rotary valve having a body portion formed with at least one intake opening and at least one discharge opening, a distributor member, securing means securing said distributor member to said body portion for angular movement relative to said body portion about an axis and for limited axial movement, operating means for moving said distributor member about said axis, said body portion and said distributor member having respective axially opposite sealing faces formed with respective recesses alignable for connecting said at least one intake opening with said at least one discharge opening in a predetermined angular position of said distributor member for flow of fluid under pressure between said openings, and sealing means for maintaining a predetermined axial distance between said faces, the improvement in the sealing means which comprises:

a. respective annular portions of said faces defining a gap therebetween, said gap being offset radially outward from said recesses, and said distributor member having another face directed axially away from said body portion;
   b. cover means spacedly enveloping said distributor member in sealing engagement with said body portion, said cover means and said other face of said distributor member bounding therebetween a chamber communicating with said gap; and
   c. pressure relief means for maintaining in said chamber a positive pressure lower than the pressure of said fluid, said pressure relief means including a pressure relief conduit leading outward of said valve from said chamber, and throttling means in said conduit separating two portions of said conduit for maintaining a pressure differential between said portions of said conduit when fluid flows through said conduit.

2. In a valve as set forth in claim 1, said throttling means including means for generating turbulence in the fluid flowing through said pressure relief conduit.

3. In a valve as set forth in claim 2, said means for generating turbulence including a throttling member in said conduit formed with an effective flow section substantially smaller than the effective flow section of said portions of the pressure relief conduit.

4. In a valve as set forth in claim 3, the length of said passage in the direction of fluid flow therethrough being smaller than the greatest dimension of said passage transverse to said direction.

5. In a valve as set forth in claim 3, said annular face portions being planar and parallel, the radial width of each of said face portions being substantially greater than said length of said passage in the direction of fluid flow therethrough.

6. In a valve as set forth in claim 1, a ball bearing operatively and radially interposed between said body portion and said distributor member, said ball bearing being coaxial with said distributor member.

7. In a valve as set forth in claim 1, a by-pass conduit connecting said portions of said pressure relief conduit, and manually operated valve means in said by-pass conduit movable between a first position in which said valve means closes said by-pass conduit and a second position in which the effective flow section of said by-pass conduit is substantially greater than the effective flow section of said throttling means.

8. In a valve as set forth in claim 1, said sealing faces being parallel and perpendicular to said axis, and said annular portions thereof each extending about said axis in a continuous, planar loop.

* * * * *